US012684048B2

(12) United States Patent
Montero et al.

(10) Patent No.:  US 12,684,048 B2
(45) Date of Patent:       Jul. 14, 2026

(54) MANAGING TELEMETRY DATA FOR A DATA PROCESSING SYSTEM USING A MANAGEMENT CONTROLLER

(71) Applicant: Dell Products L.P., Round Rock, TX (US)

(72) Inventors: Adolfo Sandor Montero, Pflugerville, TX (US); Richard M. Tonry, Georgetown, TX (US); Bassem El-Azzami, Austin, TX (US); Vinodkumar Vasudev Ottar, Mckinney, TX (US); Abeye Teshome, Austin, TX (US); Luis Antonio Valencia Reyes, Waxahachie, TX (US); Mohit Arora, Frisco, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 69 days.

(21) Appl. No.: 18/820,504

(22) Filed: Aug. 30, 2024

(65) Prior Publication Data

US 2026/0067378 A1      Mar. 5, 2026

(51) Int. Cl.
*H04L 67/55*         (2022.01)
*H04L 67/12*         (2022.01)

(52) U.S. Cl.
CPC .............. *H04L 67/55* (2022.05); *H04L 67/12* (2013.01)

(58) Field of Classification Search
CPC ................................ H04L 67/55; H04L 67/12
(Continued)

(56) References Cited

U.S. PATENT DOCUMENTS 8,042,182 B2     10/2011   Milani Comparetti et al.
8,615,785 B2     12/2013   Elrod et al.
(Continued)

FOREIGN PATENT DOCUMENTS

CA          2861660 A1 *   7/2013   .......... G06F 11/3419

OTHER PUBLICATIONS

Ahmad Muzaffar Bin Baharudin. (Nov. 20, 2023). "How to optimize your data storage workload by offloading data within watsonx.data", IBM. watsonx.data. <https://community.IBM.com/community/user/watsonx/blogs/ahmad-muzaffar-bin-baharudin/2023/11/18/how-to-offload-data-from> retrieved on Aug. 28, 2024 (4 pages).
(Continued)

*Primary Examiner* — Anthony Mejia
(74) *Attorney, Agent, or Firm* — WOMBLE BOND DICKINSON (US) LLP

(57)          ABSTRACT

Methods and systems for managing data for a data processing system are disclosed. To manage the data, a management controller hosted by the data processing system may generate a portion of telemetry data based on operation data obtained from hardware resources of the data processing system and a subscription from a management system indicating a request to receive the portion of telemetry data. Once generated, the portion of telemetry data may be provided by the management controller to the management system using an out-of-band communication channel. The management controller may subsequently obtain instructions from the management system based on the telemetry data for use in updating operation of the data processing system.

20 Claims, 7 Drawing Sheets

(58) Field of Classification Search
USPC ........................................................ 709/224
See application file for complete search history.

(56) References Cited

U.S. PATENT DOCUMENTS

| | | | |
|---|---|---|---|
| 8,843,607 B2 * | 9/2014 | Ayanam ............. | H04L 12/6418 |
| | | | 709/224 |
| 8,924,547 B1 * | 12/2014 | Belk ................... | H04L 41/0816 |
| | | | 709/224 |
| 8,924,620 B2 | 12/2014 | Harriman et al. | |
| 9,215,244 B2 | 12/2015 | Ayyagari et al. | |
| 9,734,169 B2 | 8/2017 | Redlich et al. | |
| 10,176,308 B2 | 1/2019 | Mintz et al. | |
| 10,298,670 B2 | 5/2019 | Ben-Shael et al. | |
| 10,671,765 B2 | 6/2020 | Swierk et al. | |
| 11,036,902 B2 | 6/2021 | Nicholas | |
| 11,102,122 B2 | 8/2021 | Seed et al. | |
| 11,134,380 B2 | 9/2021 | Fox et al. | |
| 11,363,104 B2 * | 6/2022 | Sethi ....................... | H04L 67/51 |
| 11,487,274 B2 | 11/2022 | Valder et al. | |
| 11,792,267 B2 | 10/2023 | Kreiner et al. | |
| 2003/0233450 A1 * | 12/2003 | Carley ................ | H04L 63/0227 |
| | | | 709/224 |
| 2011/0087387 A1 | 4/2011 | Safa-Bakhsh et al. | |
| 2012/0102139 A1 * | 4/2012 | Tran ...................... | H04W 76/15 |
| | | | 709/213 |
| 2014/0247152 A1 * | 9/2014 | Proud ................... | G08C 17/02 |
| | | | 340/870.07 |
| 2016/0173641 A1 * | 6/2016 | Broussard ............... | H04L 47/83 |
| | | | 709/224 |
| 2017/0353367 A1 * | 12/2017 | Slaight ................ | H04L 63/0428 |
| 2018/0039946 A1 | 2/2018 | Bolte et al. | |
| 2019/0268254 A1 * | 8/2019 | Frei ......................... | H04L 51/58 |
| 2020/0304367 A1 * | 9/2020 | Berdy ................. | H04L 41/0806 |
| 2021/0034048 A1 | 2/2021 | Hajizadeh | |
| 2021/0073211 A1 | 3/2021 | Wright, Sr. | |
| 2022/0038659 A1 | 2/2022 | Michel | |
| 2022/0330303 A1 * | 10/2022 | Zhao ...................... | H04W 24/10 |
| 2024/0386074 A1 * | 11/2024 | Ressler ................... | G06F 17/18 |
| 2025/0337669 A1 * | 10/2025 | Teshome ................. | H04L 43/08 |

OTHER PUBLICATIONS

Belal Mahmoud. (Jan. 19, 2024). "A Complete Guide to AI Identity Verification", KYC AML Guide. <https://kycaml.guide/blog/a-complete-guide-to-ai-identity-verification/#:~:text=The%20use%20of%20artificial%20intelligence,get%20scanned%20in%20no%20time> retrieved on Aug. 28, 2024 (4 pages).

Chow et al. (Dec. 6, 2023). "How we used OpenBMC to support AI inference on GPUs around the world", Cloudflare, The cloudflare Blog. < https://blog.cloudflare.com/how-we-used-openbmc-to-support-ai-inference-on-gpus-around-the-world/> retrieved on Aug. 28, 2024 (6 pages).

Cisco. "NextGen Out-of-Band Data Center Management Network with EVPN VXLAN", Jun. 23, 2023, <https://www.cisco.com/c/en/us/td/docs/dcn/whitepapers/nextgen-oob-datacenter-mgmt-nw-with-evpn-vxlan.html> retrieved on Aug. 28, 2024 (35 pages).

Perle Systems. "Out-of-Band Management: What is it and why do I need it?" webpage <https://www.perle.com/supportfiles/out-of-band-management.shtml>, 3 pages, May 20, 2024, retrieved from Internet Archive Wayback Machine <https://web.archive.org/web/20240520174409/https://www.perle.com/supportfiles/out-of-band-management.shtml> on Aug. 28, 2024.

* cited by examiner

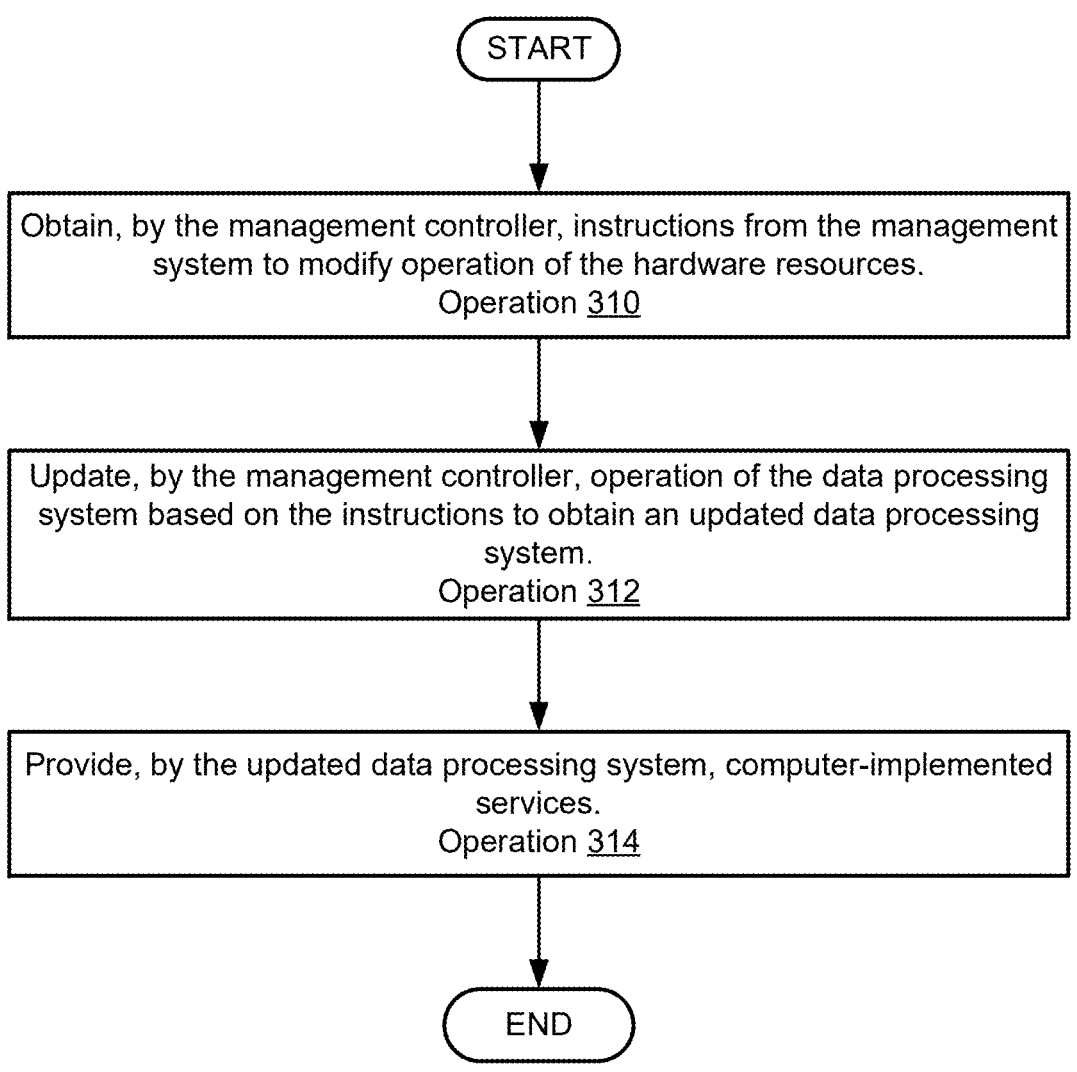

START

Obtain, by the management controller, instructions from the management system to modify operation of the hardware resources.
Operation 310

Update, by the management controller, operation of the data processing system based on the instructions to obtain an updated data processing system.
Operation 312

Provide, by the updated data processing system, computer-implemented services.
Operation 314

END

FIG. 3B

MANAGING TELEMETRY DATA FOR A DATA PROCESSING SYSTEM USING A MANAGEMENT CONTROLLER

FIELD

Embodiments disclosed herein relate generally to managing data for a data processing system. More particularly, embodiments disclosed herein relate to managing data for a data processing system by obtaining telemetry data using a management controller of the data processing system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 3A-3B show flow diagrams illustrating methods in accordance with an embodiment.

DETAILED DESCRIPTION

Figure 1A:
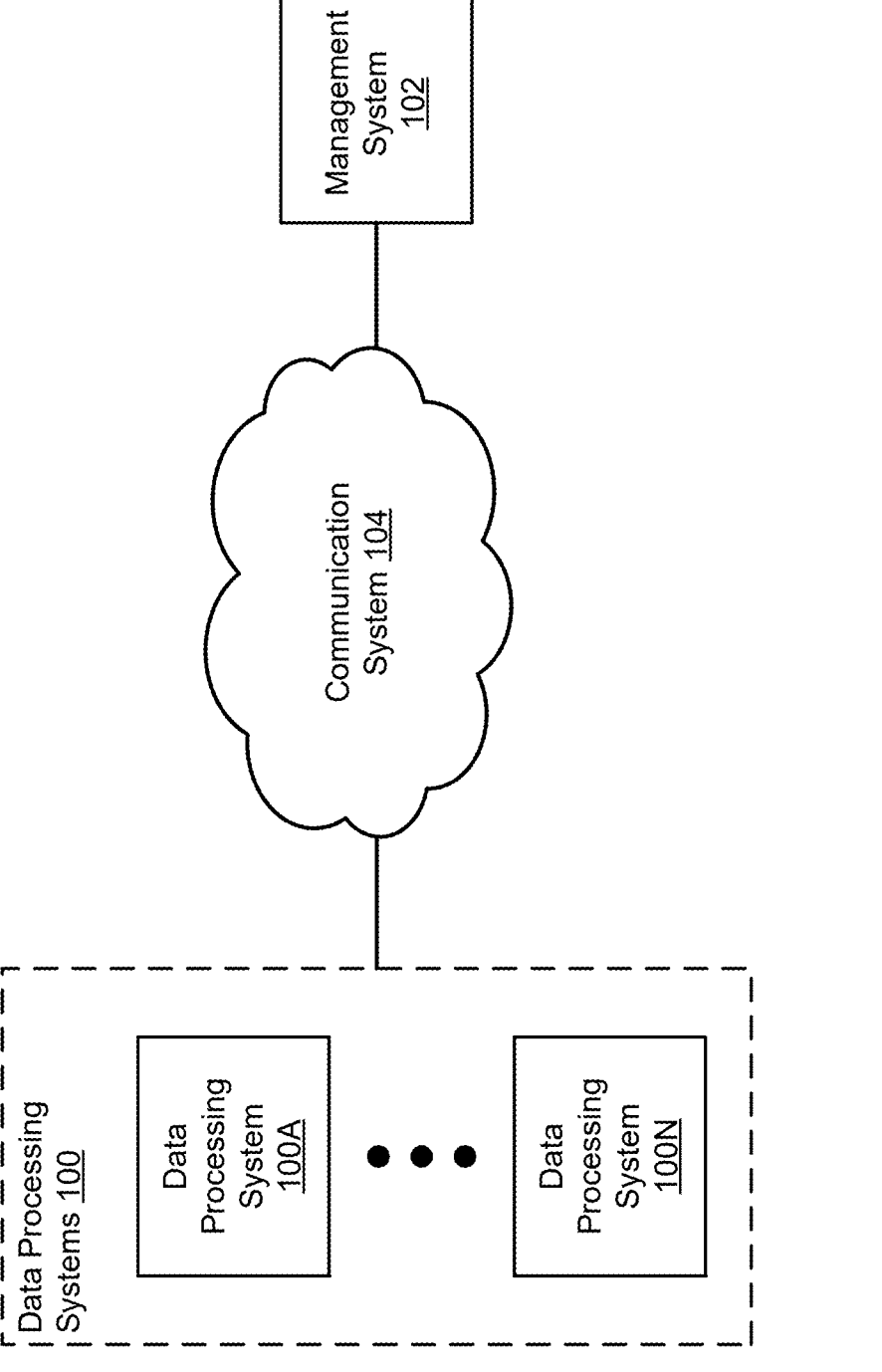
FIGS. 1A-1B show diagrams illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data for a data processing system. The data processing system may provide computer-implemented services to any type and number of other devices and/or users of the data processing system. The computer-implemented services may include any quantity and type of such services.

To provide the computer-implemented services, the data processing system may utilize hardware resources hosted by the data processing system, for example, to execute applications and/or software components hosted by the hardware resources. Operation of the hardware resources may be managed by a management system (e.g., a second data processing system) based on telemetry data obtained from the hardware resources. For example, the management system may obtain telemetry data regarding an operating state of the hardware resources and provide instructions to update operation of the hardware resources based on at least the telemetry data.

However, an impaired operating state of the hardware resources may negatively impact a functionality of the data processing system to obtain and/or provide the telemetry data to the management system. For example, if the hardware resources are depowered and/or compromised, functionality of the hardware resources to collect and/or communicate the telemetry data may be unavailable.

To manage operation of the data processing system, a management controller of the data processing system may be utilized. The management controller may operate independently from the hardware resources and may be distinct from the hardware resources. Additionally, the data processing system may be adapted to separately advertise network endpoints for the management controller and the hardware resources. Therefore, the management controller may provide management functionalities for the data processing system regardless of a status of the hardware resources.

To improve a likelihood that telemetry data may be provided to the management system, the management controller may generate the telemetry data based on a subscription from the management system. For example, the management controller may receive a request from the management system indicating a subscription to receive a portion of the telemetry data. The telemetry data may include, for example, a health state, error logs, events, metrics, and/or any other data related to operation of the hardware resources.

To generate the portion of the telemetry data, the management controller may obtain operation data from the hardware resources. To do so, the management controller may issue commands (e.g., read requests) to the hardware resources via a side band communication channel to retrieve the operation data from the hardware resources. The operation data may be used to identify whether any trigger condition of subscriptions maintained by the management controller are met.

The operation data may also be used by the management controller to perform a telemetry data generation routine defined by the subscription to obtain at least the portion of the telemetry data. For example, the subscription may indicate a request to receive an average temperature of the hardware resources over a certain period of time. The management controller may subsequently collect temperature data from the hardware resources at a predetermined frequency, and aggregate the temperature data to obtain the telemetry data.

Once obtained, the telemetry data may be provided by the management controller and via an out-of-band communication channel, to the management system. The management system may use at least the telemetry data, for example, to generate instructions for modifying operation of the hardware resources. The management controller may obtain the instructions from the management system and update operation of the data processing system based on the instructions to obtain an updated data processing system. The updated data processing system may be used to provide computer-implemented services.

Thus, embodiments disclosed herein may provide an improved method for managing data for a data processing system by using a management controller to generate and provide telemetry data to a management system. By doing so, a quality of computer-implemented services provided by the data processing system may be improved based on the telemetry data.

In an embodiment, a method for managing data for a data processing system is provided. The method may include: (i) identifying, by a management controller of the data processing system, an occurrence of a telemetry event based on a subscription from a management system for telemetry data for hardware resources of the data processing system; (ii) based on the identifying: (a) generating, by the management controller, a portion of the telemetry data for the subscription using operation data obtained by the management controller via at least one side band communication channel to the hardware resources; and (b) providing, by the management controller and via an out-of-band communication channel, the portion of the telemetry data to the management system for use in providing computer-implemented services.

The method may also include: (i) prior to identifying the occurrence of the telemetry event: (a) obtaining, by the management controller, a request from the management system, the request indicating the subscription to receive the portion of the telemetry data.

Identifying the occurrence of the telemetry event may include: (i) obtaining, by the management controller, the operation data; and (ii) using, by the management controller, the operation data to identify whether any trigger condition of subscriptions maintained by the management controller are met.

Generating the telemetry data may include: (i) obtaining, by the management controller and via a side band communication channel, the operation data; and (ii) performing, by the management controller and using at least a portion of the operation data, a telemetry data generation routine defined by the subscription to obtain at least the portion of the telemetry data.

Obtaining the operation data may include: (i) identifying, by the management controller, operating states of the hardware resources; and (ii) in an instance of the identifying where at least one of the operating states is an at least impaired operating state: (a) performing, by the management controller, an operating state compensation routine to obtain a portion of the operation data from a portion of the hardware resources that has the at least the impaired operating state.

The at least impaired operating state may be depowered, and the operating state compensation routine may be repowering the portion of the hardware resources.

The at least impaired operating state may be a low power state, and the operating state compensation routine may be repowering the portion of the hardware resources.

The portion of the telemetry data may be distinct from the operation data, and the portion of the telemetry data may be based on at least a portion of the operation data.

The method may also include: (i) obtaining, by the management controller, instructions from the management system to modify operation of the hardware resources, the instructions being based at least in part on the portion of the telemetry data; (ii) updating, by the management controller, operation of the data processing system based on the instructions to obtain an updated data processing system; and (iii) providing, by the updated data processing system, computer-implemented services.

The data processing system may include the hardware resources and a network module adapted to separately advertise network endpoints for the management controller and the hardware resources, the network endpoints being usable by the management system to address communications to the hardware resources using an in-band communication channel and the management controller using an out-of-band communication channel.

The management controller and the network module may be on separate power domains from the hardware resources so that the management controller and the network module are operable while the hardware resources are inoperable.

The out-of-band communication channel may run through the network module, and an in-band communication channel that services the hardware resources may also run through the network module.

The network module may host a transmission control protocol/internet protocol (TCP/IP) stack to facilitate network communications via the out-of-band communication channel.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide for management of data processing systems that may provide, at least in part, computer-implemented services (e.g., to user of the system and/or devices operably connected to the system).

Figure 1B:
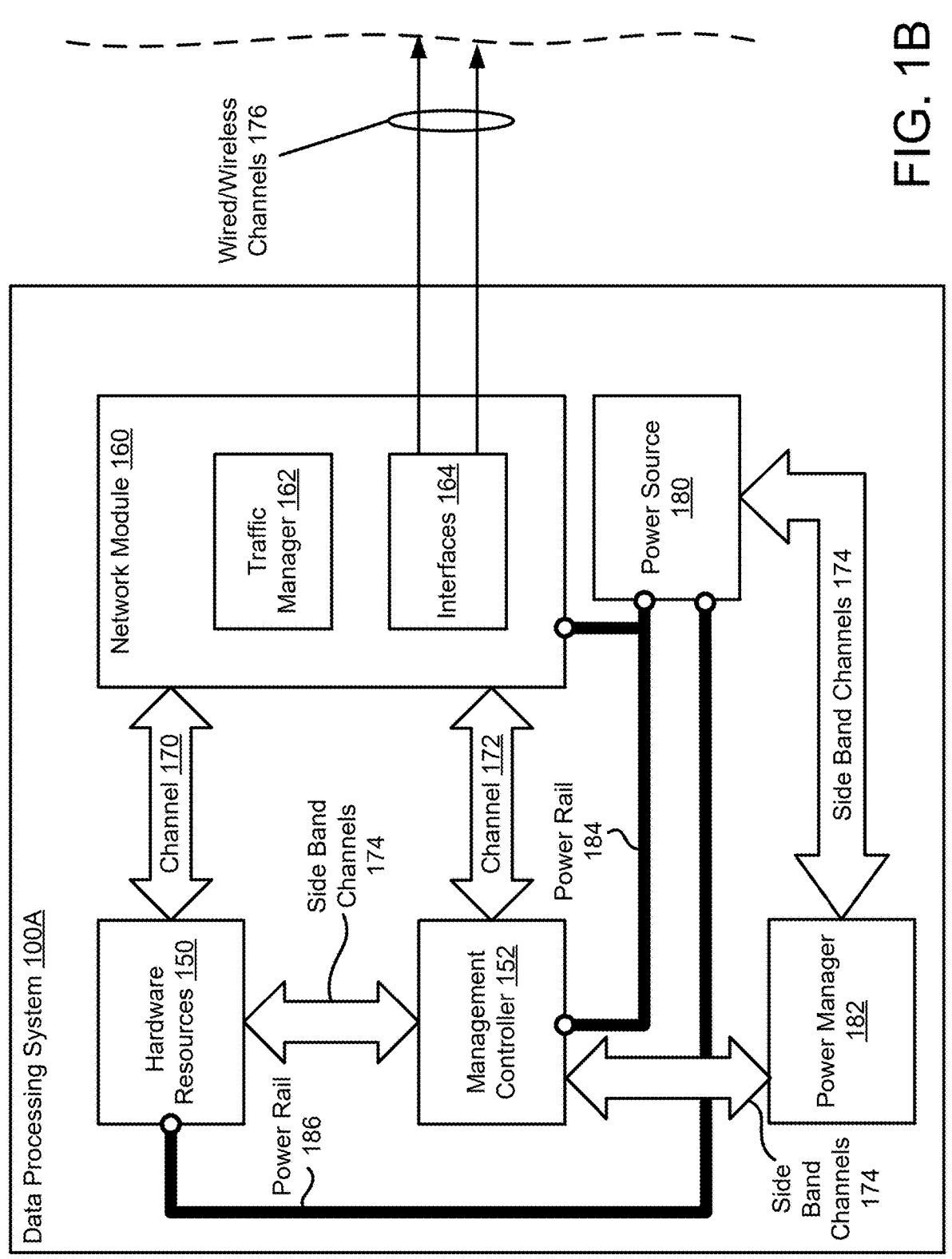

The system may include any number of data processing systems 100 (e.g., computing devices) that may each include any number of hardware components (e.g., processors, memory modules, storage devices, communication devices, etc.). The hardware components may support execution of any number and types of applications (e.g., software components). Changes in available functionalities of the hardware and/or software components may provide for various types of different computer-implemented services to be provided over time. Refer to FIG. 1B for additional details regarding data processing systems 100.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, data processing systems 100, management system 102, and/or any other type of devices (not shown in FIG. 1A). Other types of computer-implemented services may be provided by the system shown in FIG. 1A without departing from embodiments disclosed herein.

The computer-implemented services may be provided, at least in part, by hardware resources of data processing systems 100. Over time, a quantity and/or type of the computer-implemented services provided by data processing systems 100 may change. In order to accommodate modifications to the provided computer-implemented services, operation of the hardware resources and/or software components hosted by the hardware applications may be updated.

To update operation of applications and/or other components of data processing systems 100, the hardware resources may host a program (e.g., an agent) that may collect data relevant to operation of the applications and/or hardware resources while providing the computer-implemented services. The data may be provided to a remote entity for use in generating and/or communicating instructions to data processing systems 100 to modify the hardware resources for updated operation. To do so, the hardware resources may utilize various components and/or a network stack hosted by the hardware resources to interact with the remote entity.

For example, management system 102 may provide instructions based on information (e.g., telemetry data) related to operation of the hardware resources. The telemetry data may include, for example, a health state, error logs, events, metrics, and/or any other data related to the hardware resources.

However, an impaired operating state of the hardware resources may negatively impact a functionality of data processing systems 100 to obtain and/or provide the telemetry data to the management system. For example, if the hardware resources are depowered and/or compromised, functionality of the hardware resources to collect and/or communicate the telemetry data may be unavailable.

In general, embodiments disclosed herein may provide methods, systems, and/or devices for managing data for a data processing system (e.g., 100A). To improve a likelihood that telemetry data may be provided to a management system (e.g., 102) for use in managing operation of data processing system 100A, a management controller hosted by data processing system 100A may generate at least a portion of the telemetry data and/or interact with management system 102 to obtain information based on at least the portion of the telemetry data.

The management controller may operate independently from the hardware resources and may be distinct from the hardware resources. Additionally, data processing system 100A may be adapted to separately advertise network endpoints for the management controller and the hardware resources. Therefore, the management controller may provide management functionalities for data processing system 100A regardless of a status of the hardware resources.

To manage the data for data processing system 100A, the management controller may identify an occurrence of a telemetry event based on a subscription from management system 102. For example, the management controller may obtain a request from management system 102 indicating a subscription to receive a portion of the telemetry data. The subscription may indicate, for example, a type, a quantity, a frequency, an event, and/or any other conditions for data related to operation of hardware resources of data processing system 100A.

When a telemetry event is identified by the management controller, the management controller may generate the portion of the telemetry data for the subscription. To do so, the management controller may identify an operating state of the hardware resources. If identified that the hardware resources are in an impaired operating state (e.g., depowered, lower power state, etc.), the management controller may perform an operating state compensation routine (e.g., repower a portion of the hardware resources) to obtain operation data from the hardware resources. To obtain the operation data, the management controller may issue a command, via a side band communication channel, to read the operation data from memory hosted by the hardware resources.

Once obtained, the management controller may use the operation data when performing a telemetry data generation routine defined by the subscription maintained by management system 102. For example, consider a scenario when the subscription indicates a request to receive an average temperature of the hardware resources over a certain period of time. The management controller may subsequently collect operation data (e.g., temperature data) from the hardware resources at a predetermined frequency, and aggregate the temperature data to obtain desired telemetry data.

The management controller may provide the telemetry data to management system 102 using an out-of-band communication channel. By providing the telemetry data to management system 102, the management controller may obtain instructions from management system 102 to modify operation of the hardware resources based on the telemetry data. The management controller may subsequently update operation of data processing system 100A based on the instructions that may improve a quality and/or availability of computer-implemented services provided by data processing system 100A.

To provide the above noted functionality, the system may include data processing systems 100, and management system 102. Each of these components is discussed below.

Data processing systems 100 may include any number of data processing systems (e.g., 100A-100N) that may individually and/or cooperatively provide at least a portion of the computer-implemented services. Any of data processing systems 100 may include in-band components (e.g., hardware resources), out-of-band components (e.g., management controller, network modules, etc.), and functionality that may allow the out-of-band components to communicate with management system 102 via an out-of-band communication channel.

While providing the at least a portion of the computer-implemented services, a data processing system (e.g., 100A) of data processing systems 100 may generate operation data that may be used to generate telemetry data related to operation of at least a portion (e.g., hardware resources) of data processing systems 100. The telemetry data may be distinct from the operation data, and the telemetry data may be based on at least a portion of the operation data. The telemetry data may include, for example, a health state, error logs, metrics, events, and/or any other type of data that may be obtained and/or aggregated based on operation data from hardware resources of data processing systems 100.

Additionally, data processing systems 100 may communicate with and/or obtain instructions from management system 102. For example, data processing systems 100 may receive a subscription from management system 102 indicating a request to receive a portion of the telemetry data, and/or data processing systems 100 may communicate with management system 102 to provide the portion of the telemetry data to management system 102.

Management system 102 may, as discussed above, provide remote management services. To provide the remote management services, management system 102 may interact with data processing systems 100 to receive information (e.g., the telemetry data) and/or provide instructions relevant to operation of data processing systems 100. To do so, management system 102 may analyze the telemetry data and identify instructions to modify operation of at least one data processing system of data processing systems 100. For example, management system 102 may send commands to be executed to update a state of the at least one data processing system, files (e.g., disc images, repair files, etc.), updates to firmware and/or drivers, security policies, and/or any other information regarding the at least one data processing system.

While providing their functionality, any of data processing systems 100 and/or management system 102 may provide all or a portion of the methods shown in FIGS. 2A-3B.

Communication system 104 may allow any of data processing systems 100, and management system 102 to communicate with one another (and/or with other devices not illustrated in FIG. 1A). To provide its functionality, communication system 104 may be implemented with one or more wired and/or wireless networks. Any of these networks may be a private network (e.g., the "Network" shown in FIG. 4), a public network, and/or may include the Internet. For example, data processing systems 100 may be operably connected to server systems 102 via the Internet. Data processing systems 100, management system 102, and/or communication system 104 may be adapted to perform one or more protocols for communicating via communication system 104.

Any of (and/or components thereof) data processing systems 100, and management system 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Thus, as shown in FIG. 1A, a system in accordance with an embodiment may manage data for a data processing system by using a management controller to generate telemetry data based on a subscription from a management system. By doing so, operation of the data processing system may be managed based on the telemetry data regardless of an operational state of hardware resources of the data processing system.

While illustrated in FIG. 1A with a limited number of specific components, a system may include additional, fewer, and/or different components without departing from embodiments disclosed herein.

Turning to FIG. 1B, a diagram illustrating a data processing system in accordance with an embodiment is shown. Data processing system 100A shown in FIG. 1B may be similar to any of the data processing systems shown in FIG. 1A.

To provide computer-implemented services, data processing system 100A may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources.

To facilitate communication, hardware resources 150 may host a network stack that may facilitate packaging, transmission, routing, and/or other functions with respect to exchanging data with other devices. For example, the network stack may support transmission control protocol/internet protocol communication (TCP/IP) (e.g., the Internet protocol suite) thereby allowing hardware resources 150 to communicate with other devices via packet switched networks and/or other types of communication networks.

The processor may also host various applications that provide the computer-implemented services. The applications may utilize various services provided by the management entities and use (at least indirectly) the network stack to communication with other entities.

While operating, hardware resources 150 may generate data related to operation of hardware resources 150. The data generated may include, for example, error logs related to the applications, metrics (e.g., bandwidth, processing speeds, temperature, etc.), events, and/or any other types of data. The data may be stored in memory hosted by hardware resources 150, and at least a portion of the data may be communicated to management system 102 for use in managing operation of hardware resources 150.

However, the communication of telemetry data between hardware resources 150 and management system 102 may be limited when the operating system is not in an operable state. For example, when hardware resources 150 are performing a booting process, operation of the operating system may not be initiated, applications may not be executable, and/or hardware resources 150 may be compromised.

To improve a likelihood that telemetry data may be generated and/or provided to management system 102 regardless of an operating state of hardware resources 150, the telemetry data for data processing system 100A may be managed using a management controller hosted by data processing system 100A. To manage the communication, data processing system 100A may include management controller 152 and network module 160. Each of these components of data processing system 100A is discussed below.

Management controller 152 may be implemented, for example, using a system on a chip or other type of independently operating computing device (e.g., independent from the in-band components, such as hardware resources 150, of a host data processing system 100A). Management controller 152 may provide various management functionalities for data processing system 100A. For example, management controller 152 may monitor various ongoing processes performed by the in-band component, may manage power distribution, thermal management, and/or other functions of data processing system 100A.

To do so, management controller 152 may be operably connected to various components via side band channels 174 (in FIG. 1B, a limited number of side band channels are included for illustrative purposes, it will be appreciated that management controller 152 may communication with other components via any number of side band channels). The side band channels may be implemented using separate physical channels, and/or with a logical channel overlay over existing physical channels (e.g., logical division of in-band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to manage data for data processing system 100A, management controller 152 may (i) identify an occurrence of a telemetry event based on a subscription from management system 102, (ii) identify an operating state of hardware resources 150, (iii) perform an operating state compensation routine (e.g., repower a portion of hardware resources 150) if identified that at least one operating state of hardware resources 150 is an impaired operating state, (iv) retrieve operation data from hardware resources 150 (e.g., by providing a read request using side band channels 174), (v) generate a portion of the telemetry data based on at least the operation data and the subscription, (vi) communicate the portion of the telemetry data to management system 102, and/or perform any other actions.

Additionally, management controller 152 may obtain instructions from management system 102 (e.g., via an out-of-band communication channel) based on at least the telemetry data. Management controller 152 may implement the instructions to update operation of data processing system 100A for providing updated computer-implemented services. For example, based on telemetry data of parameters of operation (e.g., temperature, power consumption, etc.) of data processing system 100A that may indicate that a component of hardware resources 150 (e.g., a battery) is likely to fail (e.g., overheat), management controller may issue a command based on the instructions to modify operation of hardware resources 150 (e.g., terminate a portion of applications, activate a cooling function, etc.).

Management controller 152 may be operably connected to communication components of data processing system 100A via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 100A may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 100A, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 100A may appear to be two independent network entities, that may independently addressable, and otherwise unrelated to one another.

To facilitate management of data processing system 100A over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 100A may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 2A:
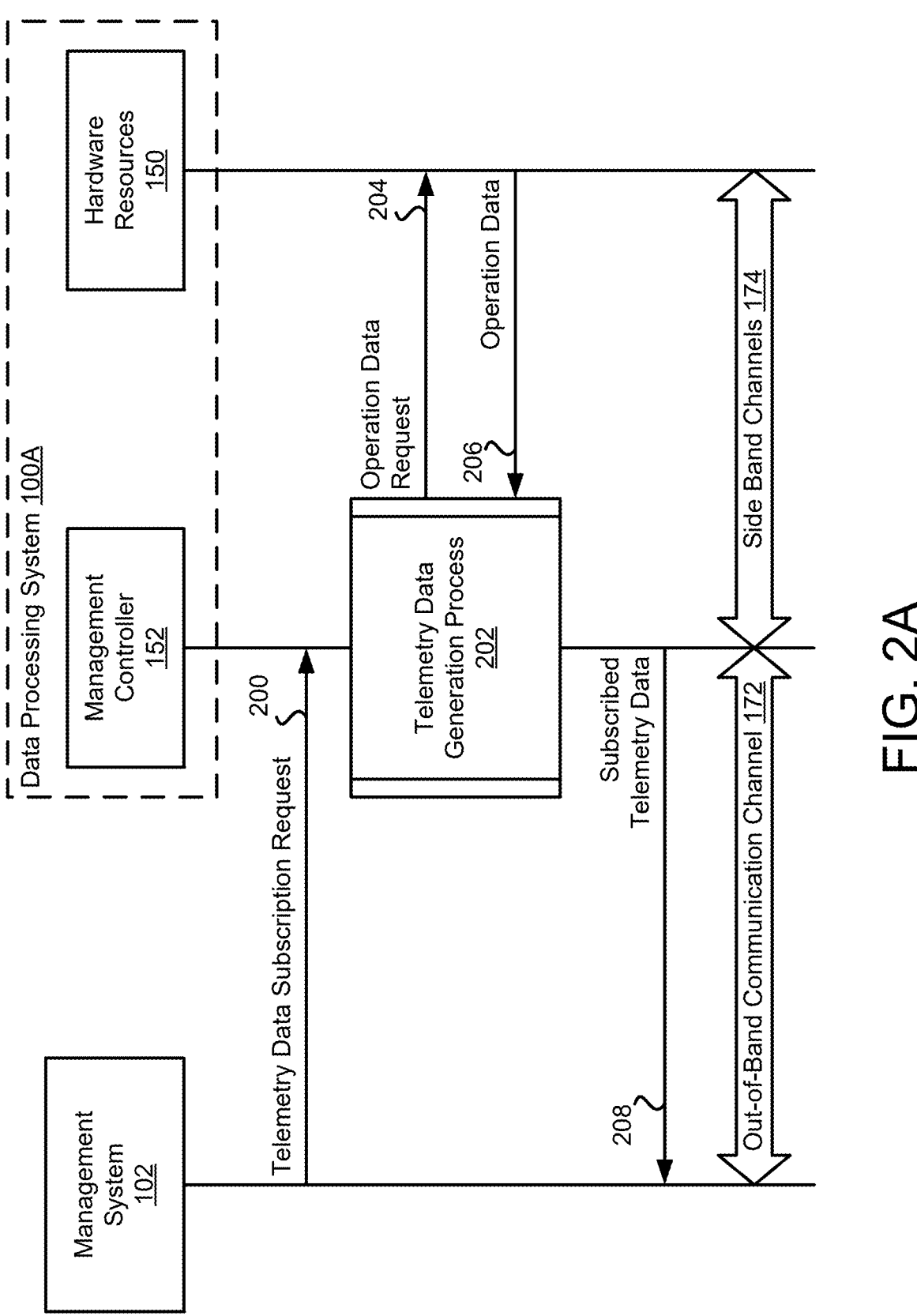
FIGS. 2A-2B show interaction diagrams in accordance with an embodiment.

When providing its functionality, management controller 152 may perform all, or a portion, of the methods and operations illustrated in FIGS. 2A-3.

While illustrated in FIG. 1B with a limited number of specific components, a system may include additional, fewer, and/or different components without departing from embodiments disclosed herein.

Figure 2B:
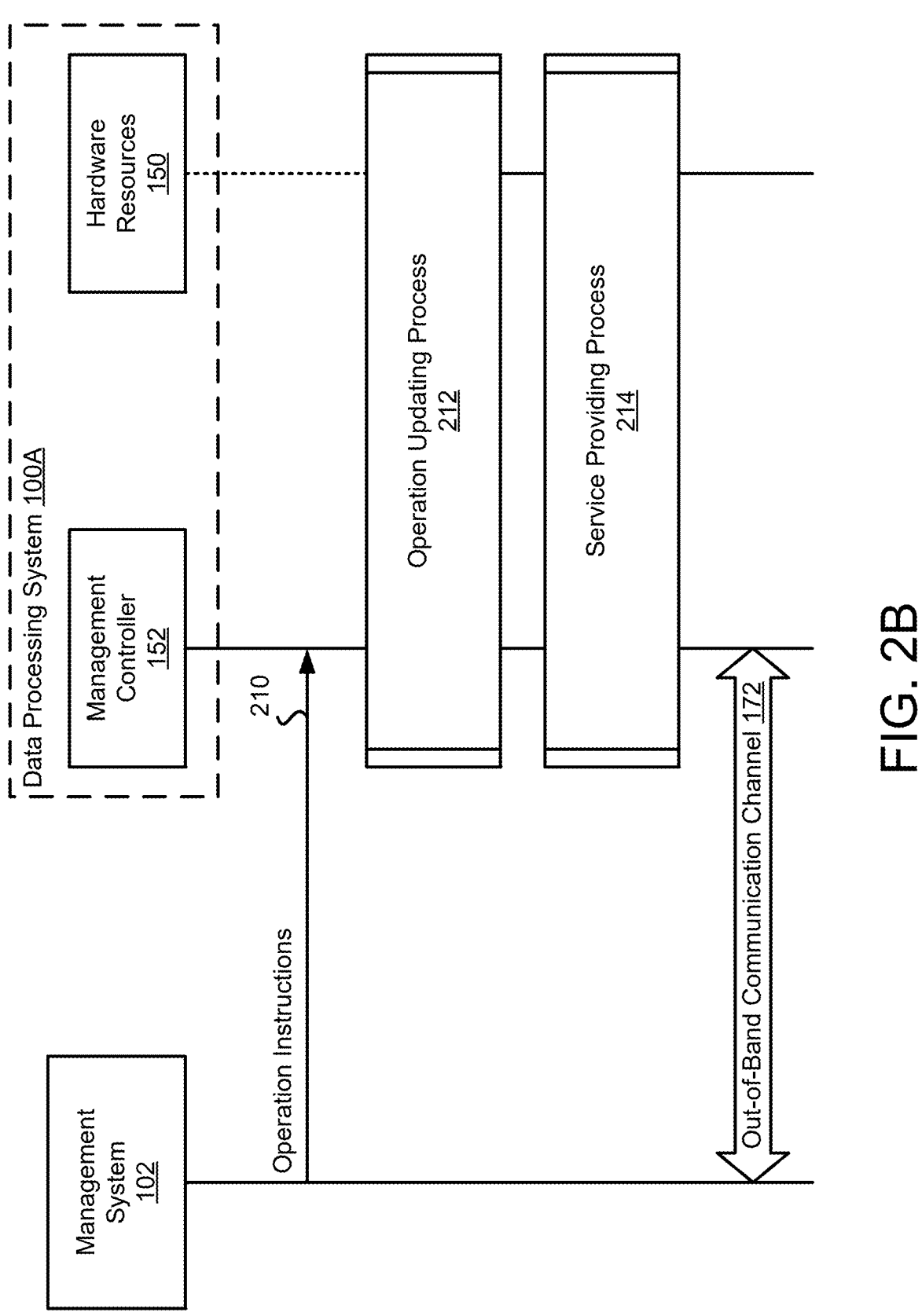

To further clarify embodiments disclosed herein, an interaction diagram in accordance with an embodiment is shown in FIGS. 2A-2B. The interaction diagram may illustrate how data may be obtained and used within the system of FIGS. 1A-1B.

In the interaction diagrams, processes performed by and interactions between components of a system in accordance with an embodiment are shown. In the diagrams, components of the system are illustrated using a first set of shapes (e.g., 102, 152, etc.), located towards the top of each figure. Lines descend from these shapes. Processes performed by the components of the system are illustrated using a second set of shapes (e.g., 202, 212, etc.) superimposed over these lines. Interactions (e.g., communication, data transmissions, etc.) between the components of the system are illustrated using a third set of shapes (e.g., 200, 204, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 200 may occur prior to the interaction labeled as 204. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur during generation of telemetry data based on a subscription.

At operation 200, a telemetry data subscription request may be provided to management controller 152 by management system 102. To generate and provide the telemetry data subscription request to management controller 152, management system 102 may (i) establish a connection with management controller 152 using a network protocol (e.g., transmission control protocol, internet protocol, etc.), (ii) transmit a message indicating a request to receive certain information regarding data processing system 100A, (iii) register to a publish/subscribe model such that management system 102 subscribes to updates from management controller 152, (iv) utilize a programmatic interface (e.g., a management program), and/or any other processes. By providing the telemetry data subscription request, management system 102 may obtain requested telemetry data from management controller 152.

To generate requested telemetry data regarding operation of data processing system 100A based on the subscription, telemetry data generation process 202 may be performed. During telemetry data generation process 202, operation data may be obtained, and telemetry data may be generated based on the operation data. To obtain the operation data, management controller 152 may (i) identify operating states of hardware resources 150, (ii) perform an operating state compensation routine (e.g., repower a portion of hardware resources 150) if identified that at least one of the operating states is an impaired operating state, (iii) issue a command to retrieve the operation data, and/or any other processes.

To generate the telemetry data, management controller 152 may (i) obtain the operation data from hardware resources 150, (ii) perform a telemetry data generation routine defined by the subscription, (iii) aggregate the operation data, and/or any other processes. The telemetry data generation routine may include, for example, (i) screening the operation data for desired attributes (e.g., type of data, source, etc.), (ii) sampling the operation data at a certain frequency and/or duration, and/or any performing other actions. By doing so, management controller may generate telemetry data requested based on the subscription maintained by management system 102.

At interaction 204, an operation data request may be provided to hardware resources 150. To generate and provide the operation data request to hardware resources 150, management controller 152 may (i) transmit a request to read at least a portion of operation data stored in storage hosted by hardware resources 150, (ii) retrieve a copy of the operation data hosted by hardware resources 150, (iii) subscribe to updates regarding operation data that may be generated by hardware resources 150, and/or any other processes.

At interaction 206, the operation data may be provided to management controller 152 by hardware resources 150. To generate and provide the operation data to management controller 152, hardware resources 150 may (i) store the operation data in a storage for subsequent retrieval by management controller 152, (ii) transmit the operation data via a message to management controller 152, and/or any other processes.

At interaction 208, subscribed telemetry data may be provided to management system 102 by management controller 152. To generate and provide the subscribed telemetry data to management system 102, management controller 152 may (i) transmit the subscribed telemetry data using a network module hosted by data processing system 100A, (ii) issue a response to the request for the subscribed telemetry data, (iii) store the subscribed telemetry data in storage and provide instructions for retrieval to management system 102, and/or any other processes.

Out-of-band communication channel 172 may be used to facilitate communication between management controller 152 and management system 102, and is shown to indicate that the communication directed between management controller 152 and management system 102 may not flow through any of the in-band components (e.g., hardware resources 150 of data processing system 100A).

Side band channels 174 may be used to facilitate communication between management controller 152 and hardware resources 150, and is shown to indicate that management controller 152 may interface with hardware resources 150 by performing management commands may include, for example, accessing secured information (e.g., operation data) from memory hosted by hardware resources 150, modifying an operating state of at least a portion of hardware resources 150, and/or performing any other actions.

Thus, using processes and interactions shown in FIG. 2A, telemetry data may be generated by a management controller hosted by a data processing system, and provided to a management system for use in managing operation of the data processing system. By doing so, operation of the data processing system may be updated based on the telemetry data to improve a quality of computer-implemented services provided by the data processing system.

Turning to FIG. 2B, a second interaction diagram in accordance with an embodiment is shown. The second interaction diagram may illustrate processes and interactions that may occur during updating of the operation of data processing system 100A.

The lines descending from some of the first set of shapes (e.g., 150) is drawn in dashing to indicate, for example, that at least a portion of the corresponding components may (i) not be operable, (ii) be operating in a first operation state, and/or (iii) not participating in operation of the system for other reasons.

At interaction 210, operating instructions may be provided by management system 102 to management controller 152. To generate and provide the operating instructions to management controller 152, management system 102 may (i) analyze telemetry data to obtain an analysis result, (ii) perform a lookup using the analysis result to identify instructions to modify operation of hardware resources 150, (iii), transmit the instructions to management controller 152 via a message, and/or any other processes.

To update operation of data processing system 100A, operation updating process 212 may be performed. During operation updating process 212, the instructions may be implemented to update operation of hardware resources 150. To implement the instructions, management controller 152 may (i) execute any number and/or types of commands indicated by the instructions (e.g., enable/disable a portion of hardware resources 150, install software, repair files, etc.), (ii) screen the instructions to identify whether the instructions are to be performed by hardware resources 150, (iii) redirect the instructions to hardware resources 150, and/or perform any other actions. The line descending from hardware resources 150 is shown in a solid line to indicate, for example, that operation of hardware resources is modified following operation updating process 212.

To provide the computer-implemented service, service providing process 214 may be performed. During service providing process 214, desired services may be provided using an updated data processing system. The desired services may be provided, for example, by (i) interacting with a user of data processing system 100A, (ii) performing updated compute processes, (iii) collecting data desired by the user and/or an entity tasked with managing data processing system 100A, (iv) implementing new security policies, and/or performing any other actions.

Thus, using processes and interactions shown in FIG. 2B, operation of data processing system 100A may updated using instructions provided by a management system based on telemetry data. By doing so, computer-implemented services may be provided using a updated data processing system that may be more desirable than computer-implemented services provided using a data processing system that may not be updated.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
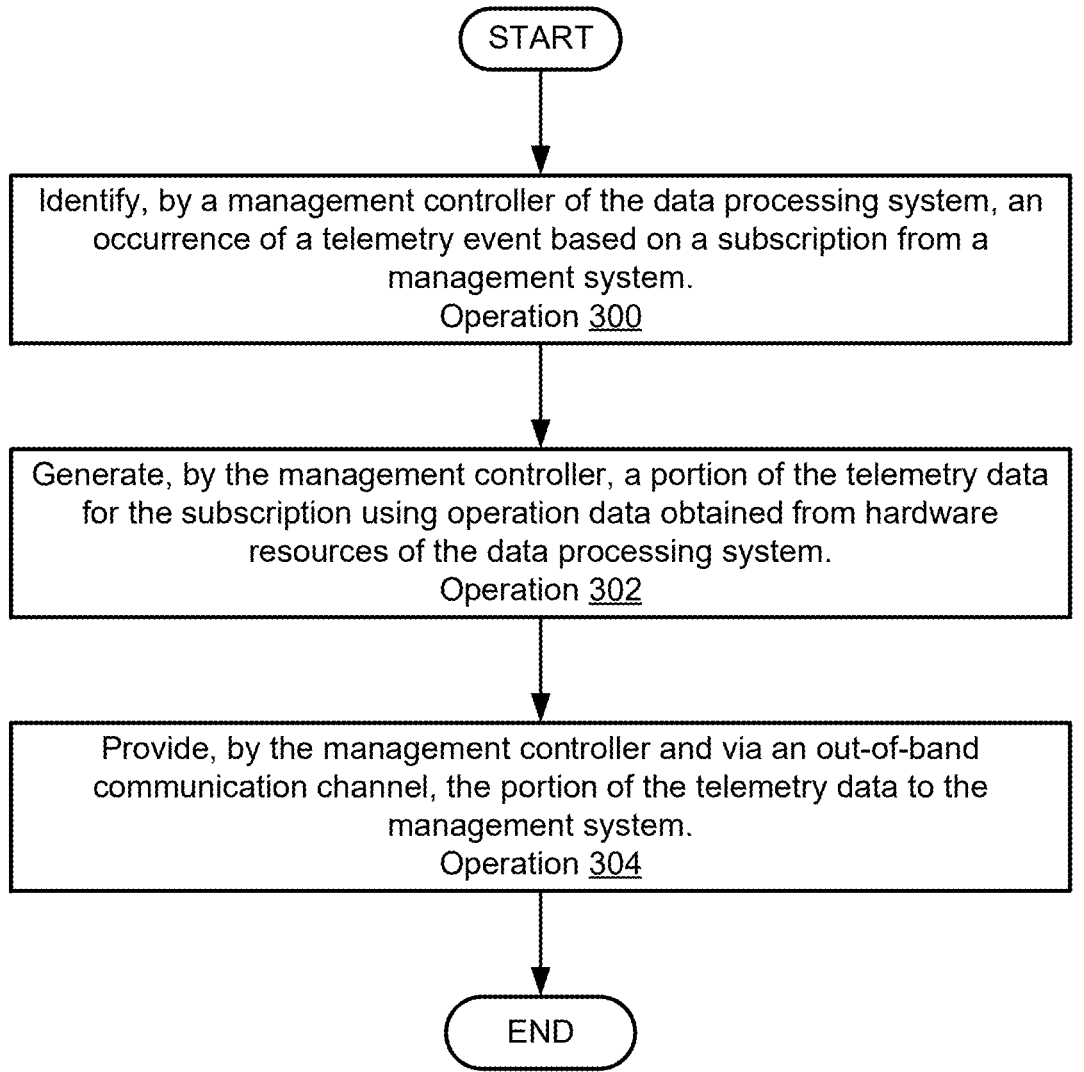

As discussed above, the components of FIGS. 1A-1B may perform various methods to manage a data processing system. FIGS. 3A-3B illustrate methods that may be performed by the components of the system of FIGS. 1A-1B. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of managing data for a data processing system in accordance with an embodiment is shown. The method may be performed, for example, by any of the components of the system of FIGS. 1A-1B, and/or other components not shown therein.

Prior to operation 300, the management controller may obtain a request from the management system indicating a subscription to receive telemetry data from the data processing system. The request may be obtained: (i) by receiving a message from the management system that may indicate any number and/or type of telemetry data requested by the management system, (ii) by receiving a subscription to a publish/subscribe model implemented by the management controller, and/or any other processes.

At operation 300, an occurrence of a telemetry event based on the subscription may be identified by the management controller. The occurrence of the telemetry event may be identified by: (i) obtaining operation data from hardware resources of the data processing system, (ii) screening the operation data for at least one trigger condition of the subscriptions maintained by the management controller, (iii) monitoring operation of the hardware resources for events indicated by the subscriptions, and/or performing any other actions.

At operation 302, a portion of the telemetry data may be generated by the management controller using operation data obtained from the hardware resources. The portion of the telemetry data may be generated by: (i) issuing management commands based on an operating state compensation routine (e.g., repowering at least a portion of the hardware resources) if identified that an operation state of the hardware resources is an impaired operating state, (ii) retrieving, using a side band channel, operation data from memory hosted by the hardware resources, (iii) aggregating the operation data based on the subscription to obtain the portion of telemetry data requested by the management system, and/or any other processes.

At operation 304, the portion of the telemetry data may be provided to the management system. The portion of the telemetry data may be provided to the management system by: (i) transmitting the portion of the telemetry data using an out-of-band communication channel to the management system, (ii) storing the portion of the telemetry data in a storage for subsequent retrieval by the management system, (iii) issuing a response to a request from the management system, and/or any other processes.

The method may end following operation 304.

Using the method shown in FIG. 3A, telemetry data related to operation of a data processing system may be obtained and/or provided to a management system using a management controller of the data processing system. Thus, operation of the data processing system may be managed based on the telemetry data regardless of an operating state of hardware resources of the data processing system.

Turning to FIG. 3B, a flow diagram illustrating a method of providing computer-implemented services using an updated data processing system in accordance with an embodiment is shown. The method may be performed, for example, by any of the components of the system of FIGS. 1A-1B, and/or other components not shown therein.

At operation 310, instructions may be obtained, by the management controller, from the management system to modify operation of the hardware resources. The instructions may be obtained by: (i) analyzing, by the management system, telemetry data to identify instructions for modification of the hardware resources, (ii) receiving, by the management controller, a message including the instructions transmitted by the management system, and/or any other processes.

At operation 312, operation of the data processing system may be updated based on the instructions to obtain an updated data processing system. Operation of the data processing system may be updated by: (i) executing any number and/or types of commands indicated by the instructions (e.g., enable/disable a portion of hardware resources 150, install software, repair files, etc.), (ii) screening the instructions to identify whether the instructions are to be performed by hardware resources 150, (iii) redirecting the instructions to hardware resources 150, and/or perform any other actions.

At operation 314, computer-implemented services may be provided by the updated data processing system. The computer-implemented services may be provided by: (i) performing update compute processes, (ii) enabling a modified set of interactions with a user of data processing system 100A, (iii) collecting data desired by the user and/or an entity tasked with managing data processing system 100A, (iv) implementing new security policies, and/or performing any other actions.

Using the method shown in FIG. 3B, operation of the data processing system may be modified based on instructions obtained from the management system (e.g., based on telemetry data from the data processing system).

Thus, using the methods shown in FIGS. 3A-3B, a data processing system may manage data by generating and/or communicating telemetry data using a management controller of the data processing system and based on a subscription from a management system. By doing so, the management controller may obtain instructions from the management system based on the telemetry data for use in updating operation of the data processing system.

Figure 4:
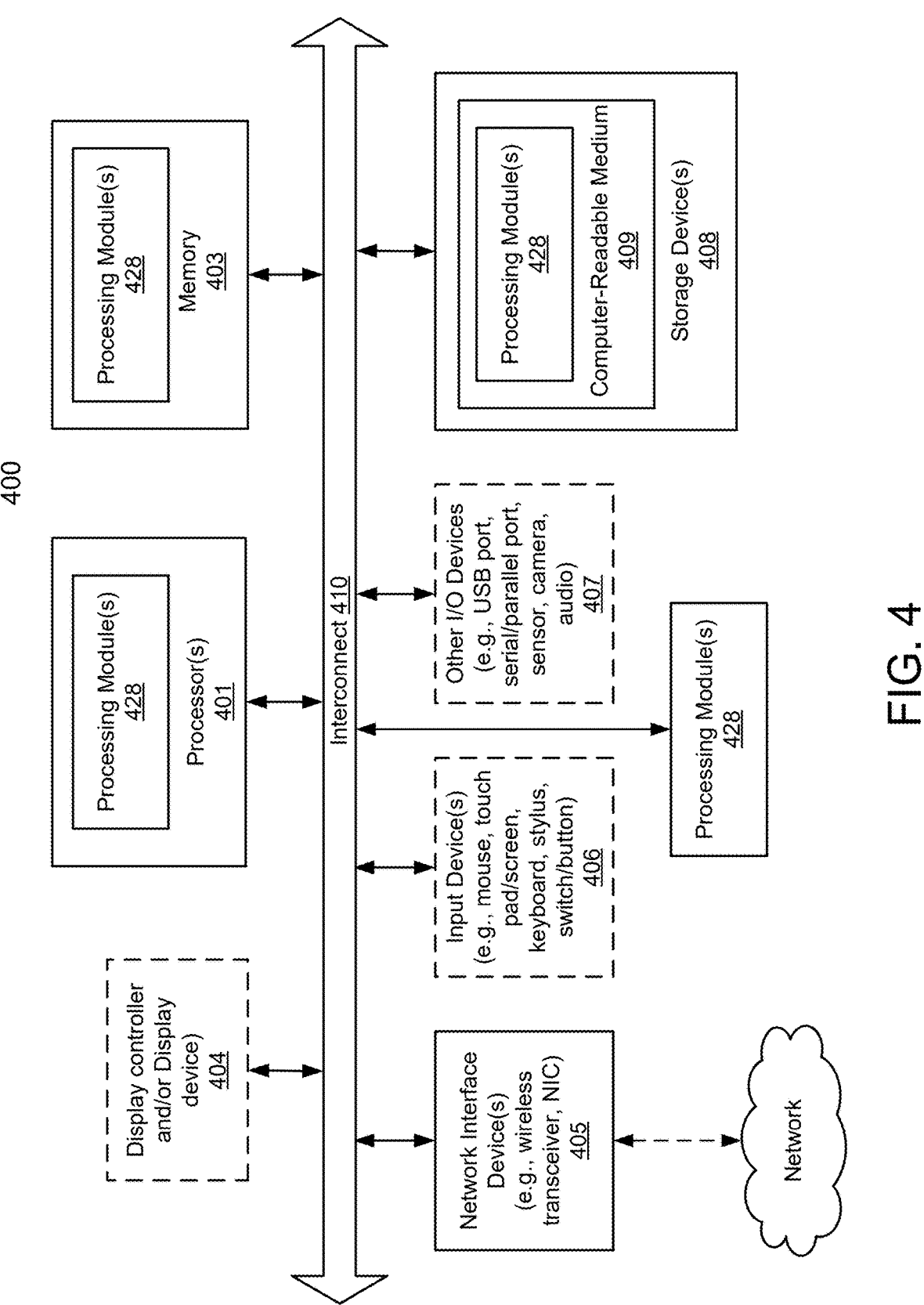
FIG. 4 shows a block diagram illustrating a data processing system in accordance with an embodiment.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing data for a data processing system, the method comprising:

identifying, by a management controller of the data processing system, an occurrence of a telemetry event based on a subscription from a management system for telemetry data for hardware resources of the data processing system;

based on the identifying:

generating, by the management controller, a portion of the telemetry data for the subscription using operation data obtained by the management controller via at least one side band communication channel to the hardware resources; and providing, by the management controller and via an out-of-band communication channel, the portion of the telemetry data to the management system for use in providing computer-implemented services, wherein the data processing system comprises the hardware resources and a network module adapted to separately advertise network endpoints for the management controller and the hardware resources, the network endpoints being usable by a remote entity to address communications to the hardware resources using an in-band communication channel and the management controller using an out-of-band communication channel.

2. The method of claim 1, further comprising:

prior to identifying the occurrence of the telemetry event:

obtaining, by the management controller, a request from the management system, the request indicating the subscription to receive the portion of the telemetry data.

3. The method of claim 2, wherein identifying the occurrence of the telemetry event comprises:

obtaining, by the management controller, the operation data; and using, by the management controller, the operation data to identify whether any trigger condition of subscriptions maintained by the management controller are met.

4. The method of claim 1, wherein generating the telemetry data comprises:

obtaining, by the management controller and via a side band communication channel, the operation data; and performing, by the management controller and using at least a portion of the operation data, a telemetry data generation routine defined by the subscription to obtain at least the portion of the telemetry data.

5. The method of claim 4, wherein obtaining the operation data comprises:

identifying, by the management controller, operating states of the hardware resources; and in an instance of the identifying where at least one of the operating states is an at least impaired operating state:

performing, by the management controller, an operating state compensation routine to obtain a portion of the operation data from a portion of the hardware resources that has the at least the impaired operating state.

6. The method of claim 5, wherein the at least impaired operating state is depowered, and the operating state compensation routine is repowering the portion of the hardware resources.

7. The method of claim 5, wherein the at least impaired operating state is a low power state, and the operating state compensation routine is repowering the portion of the hardware resources.

8. The method of claim 1, wherein the portion of the telemetry data is distinct from the operation data, and the portion of the telemetry data is based on at least a portion of the operation data.

9. The method of claim 1, further comprising:

obtaining, by the management controller, instructions from the management system to modify operation of the hardware resources, the instructions being based at least in part on the portion of the telemetry data;

updating, by the management controller, operation of the data processing system based on the instructions to obtain an updated data processing system; and providing, by the updated data processing system, computer-implemented services.

10. The method of claim 1, wherein the management controller and the network module are on separate power domains from the hardware resources so that the management controller and the network module are operable while the hardware resources are inoperable.

11. The method of claim 1, wherein the out-of-band communication channel runs through the network module, and an in-band communication channel that services the hardware resources also runs through the network module.

12. The method of claim 1, wherein the network module hosts a transmission control protocol/internet protocol (TCP/IP) stack to facilitate network communications via the out-of-band communication channel.

13. A non-transitory machine-readable medium having instructions stored therein, which when executed by a processor, cause the processor to perform operations for managing data for a data processing system, the operations comprising:

identifying, by a management controller of the data processing system, an occurrence of a telemetry event based on a subscription from a management system for telemetry data for hardware resources of the data processing system;

based on the identifying:

generating, by the management controller, a portion of the telemetry data for the subscription using operation data obtained by the management controller via at least one side band communication channel to the hardware resources; and providing, by the management controller and via an out-of-band communication channel, the portion of the telemetry data to the management system for use in providing computer-implemented services, wherein the data processing system comprises the hardware resources and a network module adapted to separately advertise network endpoints for the management controller and the hardware resources, the network endpoints being usable by a remote entity to address communications to the hardware resources using an in-band communication channel and the management controller using an out-of-band communication channel.

14. The non-transitory machine-readable medium of claim 13, wherein the operations further comprise:

prior to identifying the occurrence of the telemetry event:

obtaining, by the management controller, a request from the management system, the request indicating the subscription to receive the portion of the telemetry data.

15. The non-transitory machine-readable medium of claim 14, wherein identifying the occurrence of the telemetry event comprises:

obtaining, by the management controller, the operation data; and using, by the management controller, the operation data to identify whether any trigger condition of subscriptions maintained by the management controller are met.

16. The non-transitory machine-readable medium of claim 13, wherein generating the telemetry data comprises:

obtaining, by the management controller and via a side band communication channel, the operation data; and performing, by the management controller and using at least a portion of the operation data, a telemetry data generation routine defined by the subscription to obtain at least the portion of the telemetry data.

17. A data processing system, comprising:

a processor;

a memory coupled to the processor to store instructions, which when executed by the processor, cause the processor to perform operations for managing data for the data processing system, the operations comprising:

identifying, by a management controller of the data processing system, an occurrence of a telemetry event based on a subscription from a management system for telemetry data for hardware resources of the data processing system;

based on the identifying:

generating, by the management controller, a portion of the telemetry data for the subscription using operation data obtained by the management controller via at least one side band communication channel to the hardware resources; and providing, by the management controller and via an out-of-band communication channel, the portion of the telemetry data to the management system for use in providing computer-implemented services; and a network module adapted to separately advertise network endpoints for the management controller and the hardware resources, the network endpoints being usable by a remote entity to address communications to the hardware resources using an in-band communication channel and the management controller using an out-of-band communication channel.

18. The data processing system of claim 17, wherein the operations further comprise: prior to identifying the occurrence of the telemetry event:

obtaining, by the management controller, a request from the management system, the request indicating the subscription to receive the portion of the telemetry data.

19. The data processing system of claim 18, wherein identifying the occurrence of the telemetry event comprises:

obtaining, by the management controller, the operation data; and using, by the management controller, the operation data to identify whether any trigger condition of subscriptions maintained by the management controller are met.

20. The data processing system of claim 17, wherein generating the telemetry data comprises:

obtaining, by the management controller and via a side band communication channel, the operation data; and performing, by the management controller and using at least a portion of the operation data, a telemetry data generation routine defined by the subscription to obtain at least the portion of the telemetry data.

* * * * *